(12) United States Patent
Lu et al.

(10) Patent No.: US 7,424,189 B2
(45) Date of Patent: Sep. 9, 2008

(54) MID-SPAN BREAKOUT WITH POTTED CLOSURE

(75) Inventors: Yu Lu, Westborough, MA (US); Jeff Gniadek, Northbridge, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/490,603

(22) Filed: Jul. 21, 2006

(65) Prior Publication Data

US 2007/0212003 A1 Sep. 13, 2007

Related U.S. Application Data

(60) Provisional application No. 60/781,621, filed on Mar. 9, 2006.

(51) Int. Cl.
*G02B 6/44* (2006.01)
(52) U.S. Cl. ........................... 385/100; 385/109
(58) Field of Classification Search .......... 385/100–114
See application file for complete search history.

(56) References Cited

U.S. PATENT DOCUMENTS

| | | | |
|---|---|---|---|
| 2,047,152 A | 7/1936 | Mitchell | |
| 3,076,737 A | 2/1963 | Roberts | |
| 3,691,505 A | 9/1972 | Graves | |
| 3,750,058 A | * 7/1973 | Bankert et al. | 333/242 |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,146,302 A | 3/1979 | Jachimowicz | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |

(Continued)

FOREIGN PATENT DOCUMENTS

| | | |
|---|---|---|
| DE | 35 37 684 A1 | 4/1987 |
| EP | 0 115 725 A1 | 8/1984 |
| EP | 1 361 465 A1 | 11/2003 |
| JP | 58-105114 | 6/1983 |
| JP | 60-169813 | 9/1985 |

(Continued)

OTHER PUBLICATIONS

"Cable Assemblies: Molding & Termination," http://www.dgo.com/prodcable.htm, 8 pages (Copyright 2001).

(Continued)

*Primary Examiner*—Kevin S Wood
*Assistant Examiner*—John M Bedtelyon
(74) *Attorney, Agent, or Firm*—Merchant & Gould P.C.

(57) ABSTRACT

A breakout assembly includes a distribution cable, a tether cable, and at least one optical fiber. The distribution cable includes a breakout location having a length. The tether cable is secured to the distribution cable. The optical fiber extends along the length of the breakout location from the distribution cable to the tether cable. A polymeric tube including ring-type reinforcements extends along the length of the breakout location and encloses the optical fiber.

11 Claims, 6 Drawing Sheets

U.S. PATENT DOCUMENTS

| | | | |
|---|---|---|---|
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |
| 4,589,939 A | 5/1986 | Mohebban et al. | |
| 4,591,330 A | 5/1986 | Charlebois et al. | |
| 4,592,721 A | 6/1986 | Charlebois et al. | |
| 4,595,256 A | 6/1986 | Guazzo | |
| 4,609,773 A | 9/1986 | Brown et al. | |
| 4,625,073 A | 11/1986 | Breesch et al. | |
| 4,629,597 A | 12/1986 | Charlebois et al. | |
| 4,648,606 A | 3/1987 | Brown et al. | |
| 4,648,919 A | 3/1987 | Diaz et al. | |
| 4,654,474 A | 3/1987 | Charlebois et al. | |
| 4,666,537 A | 5/1987 | Dienes | |
| 4,670,069 A | 6/1987 | Debbaut et al. | |
| 4,670,980 A | 6/1987 | Charlebois et al. | |
| 4,678,866 A | 7/1987 | Charlebois | |
| 4,684,764 A | 8/1987 | Luzzi et al. | |
| 4,701,574 A | 10/1987 | Shimirak et al. | |
| 4,725,035 A | 2/1988 | Charlebois et al. | |
| 4,732,628 A | 3/1988 | Dienes | |
| 4,747,020 A | 5/1988 | Brickley et al. | |
| 4,761,052 A | 8/1988 | Buekers et al. | |
| 4,764,232 A | 8/1988 | Hunter | |
| 4,818,824 A | 4/1989 | Dixit et al. | |
| 4,822,434 A | 4/1989 | Sawaki et al. | |
| 4,875,952 A | 10/1989 | Mullin et al. | |
| 4,884,863 A | 12/1989 | Throckmorton | |
| 4,913,512 A | 4/1990 | Anderton | |
| 4,961,623 A | 10/1990 | Midkiff et al. | |
| 4,963,698 A | 10/1990 | Chang et al. | |
| 5,004,315 A | 4/1991 | Miyazaki | |
| 5,018,825 A * | 5/1991 | Rowland | 385/101 |
| 5,042,901 A | 8/1991 | Merriken et al. | |
| 5,046,811 A | 9/1991 | Jung et al. | |
| 5,054,868 A | 10/1991 | Hoban et al. | |
| 5,066,095 A | 11/1991 | Dekeyser et al. | |
| 5,074,808 A | 12/1991 | Beamenderfer et al. | |
| 5,097,529 A | 3/1992 | Cobb et al. | |
| 5,099,088 A | 3/1992 | Usami et al. | |
| 5,115,105 A | 5/1992 | Gallusser et al. | |
| 5,121,458 A | 6/1992 | Nilsson et al. | |
| 5,125,060 A | 6/1992 | Edmundson | |
| 5,185,844 A | 2/1993 | Bensel, III et al. | |
| 5,194,692 A | 3/1993 | Gallusser et al. | |
| 5,210,812 A | 5/1993 | Nilsson et al. | |
| 5,217,808 A | 6/1993 | Cobb | |
| 5,241,611 A | 8/1993 | Gould | |
| 5,245,151 A | 9/1993 | Chamberlain et al. | |
| 5,335,408 A | 8/1994 | Cobb | |
| 5,347,089 A | 9/1994 | Barrat et al. | |
| 5,353,367 A | 10/1994 | Czosnowski et al. | |
| 5,376,196 A | 12/1994 | Grajewski et al. | |
| 5,378,853 A | 1/1995 | Clouet et al. | |
| 5,394,502 A | 2/1995 | Caron | |
| 5,402,515 A | 3/1995 | Vidacovich et al. | |
| 5,410,105 A | 4/1995 | Tahara et al. | |
| RE34,955 E | 5/1995 | Anton et al. | |
| 5,420,958 A | 5/1995 | Henson et al. | |
| 5,440,665 A | 8/1995 | Ray et al. | |
| 5,442,726 A | 8/1995 | Howard et al. | |
| 5,450,517 A | 9/1995 | Essert | |
| 5,456,959 A * | 10/1995 | Dawes | 428/34.1 |
| 5,491,766 A | 2/1996 | Huynh et al. | |
| 5,509,202 A | 4/1996 | Abdow | |
| 5,517,592 A | 5/1996 | Grajewski et al. | |
| 5,528,718 A | 6/1996 | Ray et al. | |
| 5,657,413 A | 8/1997 | Ray et al. | |
| 5,666,453 A | 9/1997 | Dannenmann | |
| 5,684,911 A | 11/1997 | Burgett | |
| 5,696,864 A | 12/1997 | Smith et al. | |
| 5,734,776 A | 3/1998 | Puetz | |
| 5,767,448 A | 6/1998 | Dong | |
| 5,778,122 A | 7/1998 | Giebel et al. | |
| 5,823,646 A | 10/1998 | Arizpe et al. | |
| 5,825,963 A | 10/1998 | Burgett | |
| 5,892,870 A | 4/1999 | Fingler et al. | |
| 5,945,633 A | 8/1999 | Ott et al. | |
| 5,969,294 A | 10/1999 | Eberle et al. | |
| 5,997,186 A | 12/1999 | Huynh et al. | |
| RE36,592 E | 2/2000 | Giebel et al. | |
| 6,104,846 A | 8/2000 | Hodgson et al. | |
| RE37,028 E | 1/2001 | Cooke et al. | |
| 6,181,861 B1 | 1/2001 | Wenski et al. | |
| 6,215,930 B1 | 4/2001 | Estes et al. | |
| 6,246,821 B1 * | 6/2001 | Hemken et al. | 385/101 |
| 6,255,584 B1 | 7/2001 | Renaud | |
| 6,376,774 B1 | 4/2002 | Oh et al. | |
| 6,407,338 B1 | 6/2002 | Smith | |
| 6,466,725 B2 | 10/2002 | Battey et al. | |
| 6,493,500 B1 | 12/2002 | Oh et al. | |
| 6,539,160 B2 | 3/2003 | Battey et al. | |
| 6,579,014 B2 | 6/2003 | Melton et al. | |
| 6,619,697 B2 | 9/2003 | Griffioen et al. | |
| 6,621,975 B2 | 9/2003 | Laporte et al. | |
| 6,648,520 B2 | 11/2003 | McDonald et al. | |
| 6,655,016 B2 | 12/2003 | Renaud | |
| 6,668,127 B1 | 12/2003 | Mahony | |
| 6,706,968 B2 | 3/2004 | Yaworski et al. | |
| 6,764,220 B2 | 7/2004 | Griffiths et al. | |
| 6,810,194 B2 | 10/2004 | Griffiths et al. | |
| 6,819,842 B1 | 11/2004 | Vogel et al. | |
| 6,856,748 B1 | 2/2005 | Elkins, II et al. | |
| 6,866,430 B1 * | 3/2005 | Faiss et al. | 385/96 |
| 6,880,219 B2 | 4/2005 | Griffioen et al. | |
| 7,006,739 B2 * | 2/2006 | Elkins et al. | 385/100 |
| 7,016,592 B2 | 3/2006 | Elkins, II et al. | |
| 7,127,143 B2 * | 10/2006 | Elkins et al. | 385/100 |
| 7,155,093 B2 * | 12/2006 | Elkins et al. | 385/100 |
| 7,197,214 B2 * | 3/2007 | Elkins et al. | 385/100 |
| 7,330,621 B2 * | 2/2008 | Elkins et al. | 385/100 |
| 2004/0016564 A1 | 1/2004 | Lambert, Jr. | |
| 2004/0074852 A1 | 4/2004 | Knudsen et al. | |
| 2004/0228589 A1 | 11/2004 | Melton et al. | |
| 2004/0247265 A1 | 12/2004 | Takano et al. | |
| 2005/0053342 A1 | 3/2005 | Melton et al. | |
| 2005/0069275 A1 | 3/2005 | Brants et al. | |
| 2005/0111799 A1 | 5/2005 | Cooke et al. | |
| 2005/0111800 A1 | 5/2005 | Cooke et al. | |
| 2005/0129375 A1 | 6/2005 | Elkins, II et al. | |
| 2005/0175308 A1 | 8/2005 | Elkins, II et al. | |
| 2005/0259928 A1 * | 11/2005 | Elkins et al. | 385/100 |
| 2005/0259929 A1 | 11/2005 | Elkins, II et al. | |
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |

FOREIGN PATENT DOCUMENTS

| | | |
|---|---|---|
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |

| | | |
|---|---|---|
| JP | 63-310317 | 12/1988 |
| JP | 1-138828 | 5/1989 |
| JP | 2001-116968 | 4/2001 |
| WO | WO 91/03854 | 3/1991 |
| WO | WO 2005/119322 A1 | 12/2005 |
| WO | WO 2006/044080 A1 | 4/2006 |

OTHER PUBLICATIONS

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

* cited by examiner

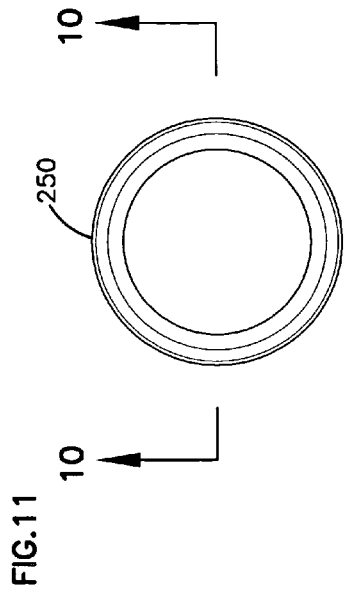
FIG.11
FIG.8
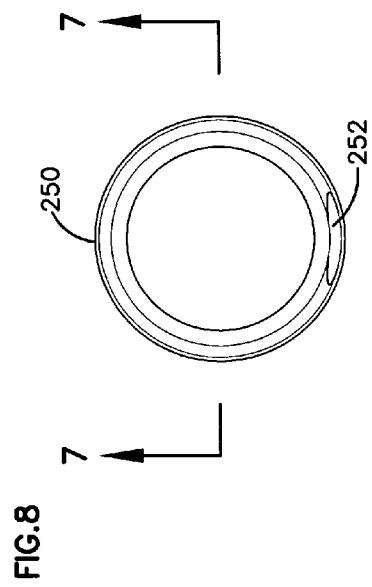
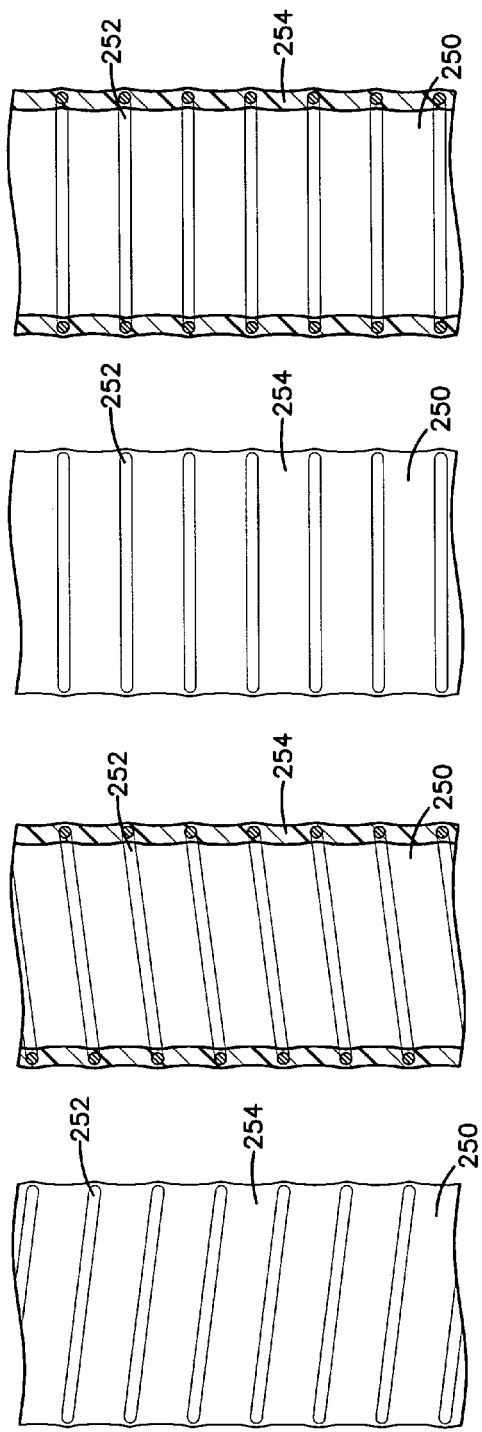
FIG.10
FIG.9
FIG.7
FIG.6

MID-SPAN BREAKOUT WITH POTTED CLOSURE

CROSS REFERENCE TO RELATED APPLICATIONS

This application claims the benefit of U.S. Provisional Patent Application Ser. No. 60/781,621, filed Mar. 9, 2006, which application is hereby incorporated by reference in its entirety.

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable.

Branch cables can manually be separated out from a main cable in the field using field splices. Field splices are typically housed within flexible over-mold enclosures to protect the splice against the outdoor environment. The process of forming the over-mold, however, is time consuming and complicated.

Stub cables are typically branch cables that are routed from breakout locations to intermediate access locations 104 such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations.

SUMMARY

Certain aspects of the disclosure relate to mid-span breakout configurations for pre-terminated fiber optic distribution cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 6 is a partial front view of one example embodiment of a closure;

FIG. 7 is a partial sectional view along the longitudinal axis of the closure of FIG. 6;

FIG. 8 is a cross-sectional view of the closure of FIG. 6;

FIG. 9 is a partial front view of another example embodiment of a closure;

FIG. 10 is a partial sectional view along the longitudinal axis of the closure of FIG. 9; and FIG. 11 is a cross-sectional view of the closure of FIG. 9.

DETAILED DESCRIPTION

The present disclosure relates to mid-span breakout arrangements provided on distribution cables. In particular, the present disclosure relates to a mid-span breakout arrangement including optical fibers helically wound around the distribution cable.

Figure 1:
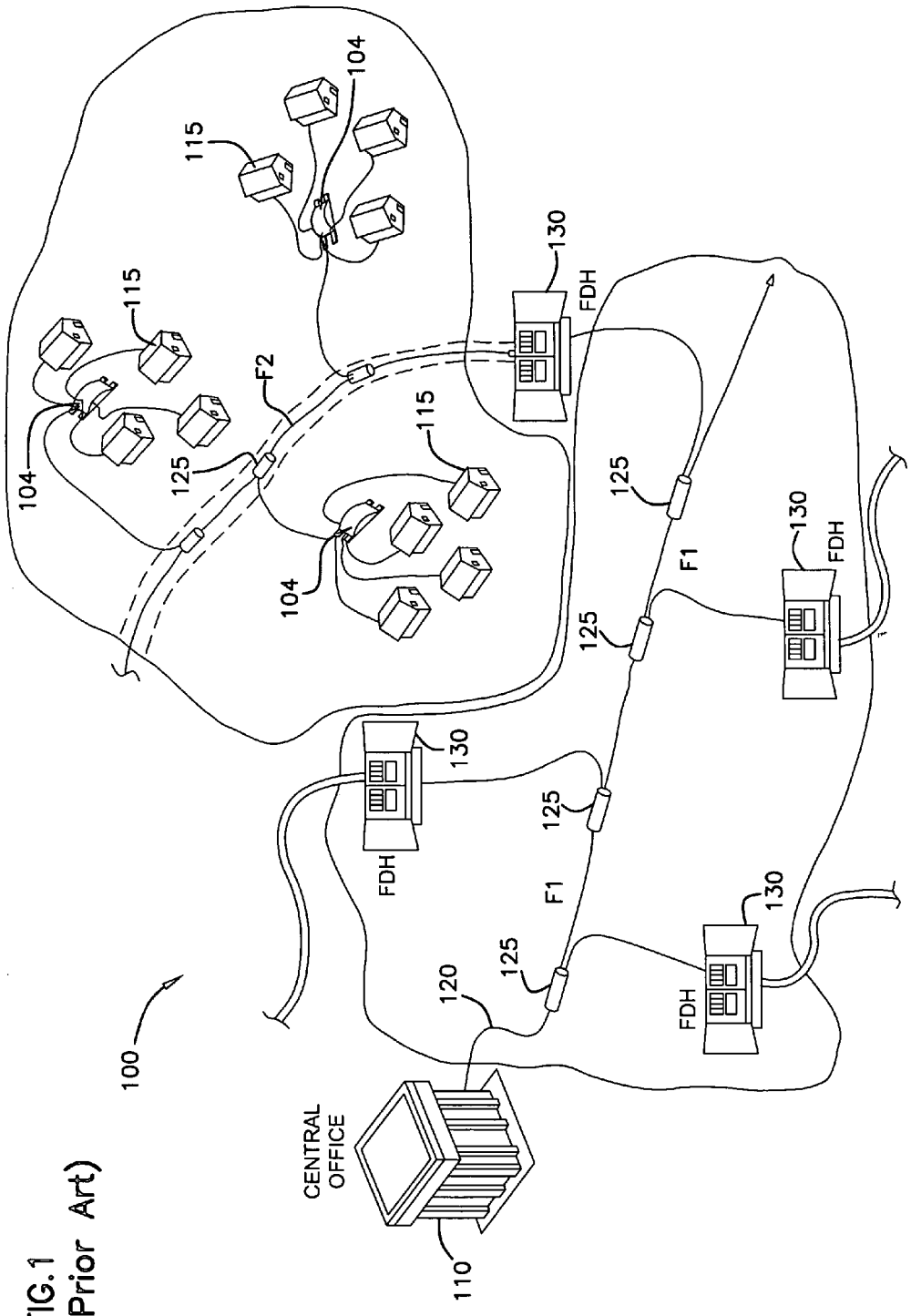
FIG. 1 shows a prior art passive fiber optic network.
Figure 2:
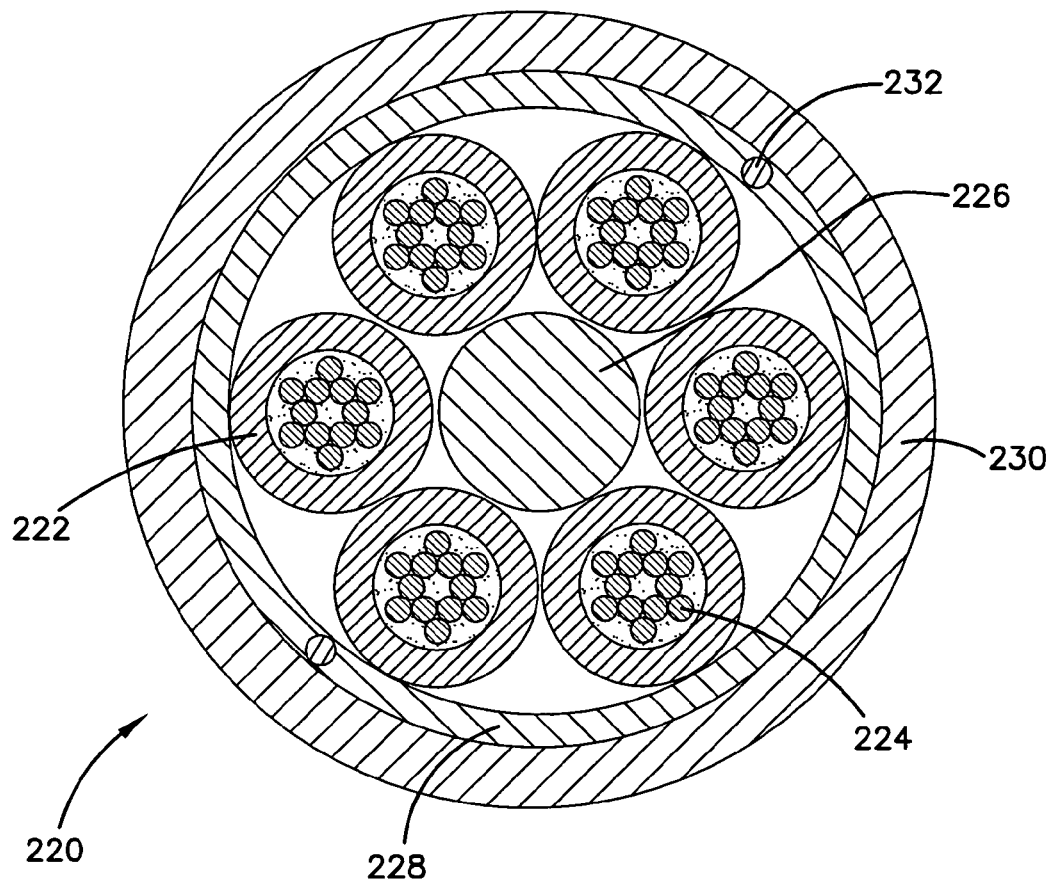
FIG. 2 shows an example of the distribution cable including six separate buffer tubes each containing twelve fibers.

Referring now to the figures in general, a typical distribution cable includes a relatively large number of fibers (e.g., 72, 144 or more fibers). The fibers are typically segregated into separate groups with each group contained within a separate buffer tube. For example, FIG. 2 shows an example of the distribution cable 220 including six separate buffer tubes 222 each containing twelve fibers 224. The buffer tubes 222 may be gel filled. The distribution cable 220 also includes a central strength member 226 for reinforcing the cable 220, and an outer strength member 228 such as Kevlar for also reinforcing the cable. The distribution cable 220 further includes an outer jacket 230 that encloses the buffer tubes 222. Ripcords 232 can be provided for facilitating tearing away portions of the jacket 230 to access the fibers 224 within the jacket 230. While distribution cables typically have a large number of fibers, the various aspects of the present disclosure are also applicable to distribution cables having fewer numbers of fibers (e.g., 2 or more fibers).

A typical mid-span breakout location is provided at an intermediate point along the length of a distribution cable. Commonly a tether (e.g., a drop cable or a stub cable) branches out from the distribution cable at the breakout location. The tether cable most commonly has a fewer number of fibers as compared to the number of fibers provided within the distribution cable. In an example embodiment, the tether has no more than twelve fibers. The tether includes fibers that extend between first and second ends. The first ends of the tether fibers are preferably spliced to selected fibers of the distribution cable at the breakout location. The second ends of the tether fibers can be either connectorized or unconnectorized.

Figure 3:
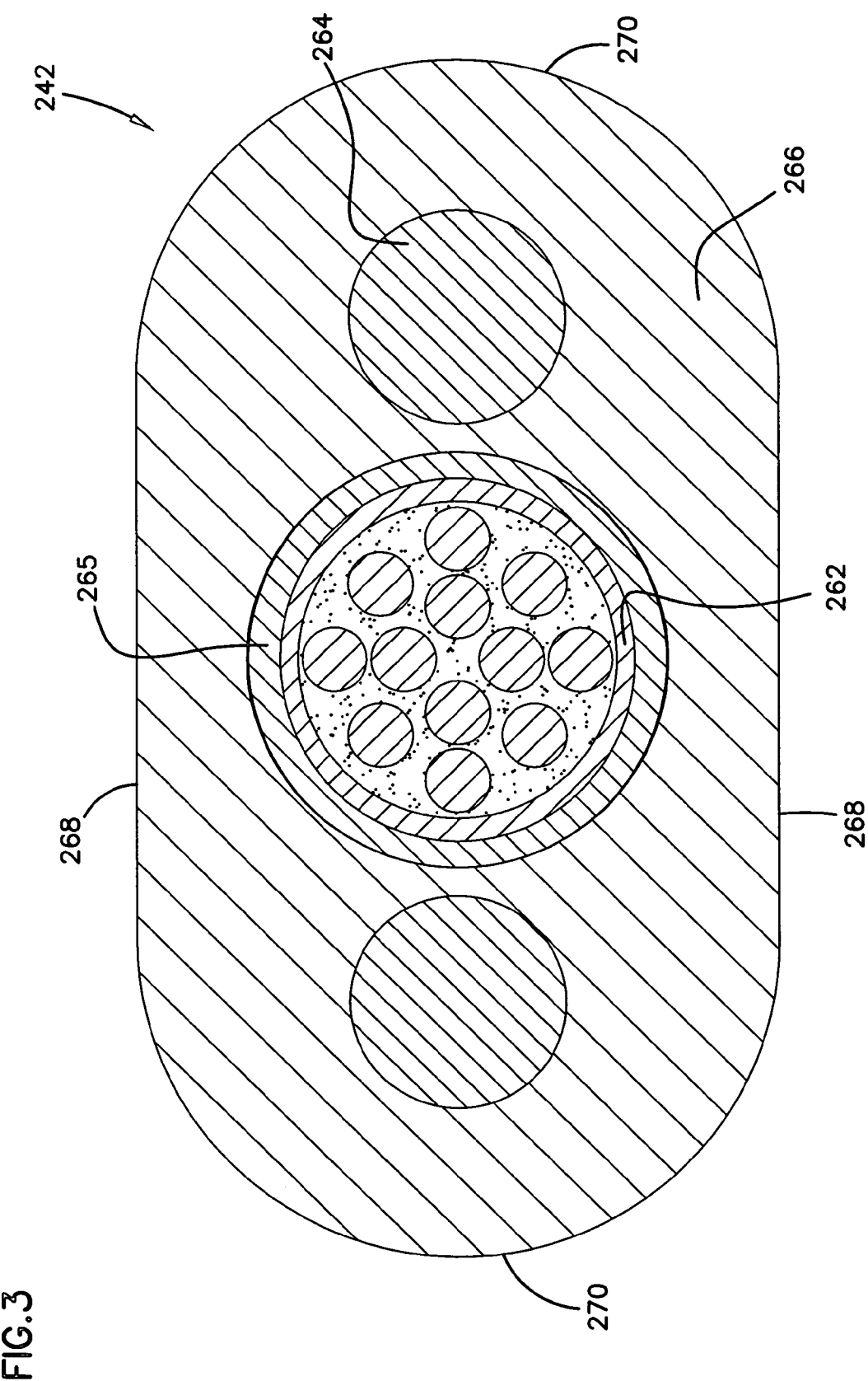
FIG. 3 depicts an example tether as having a flat cable configuration.

For example, FIG. 3 depicts an example tether 242 as having a flat cable configuration. The flat cable configuration includes a central buffer tube 262 containing one to twelve fibers (e.g., either loose or ribbonized). Strength members 264 (e.g., flexible rods formed by glass fiber reinforced epoxy) are positioned on opposite sides of the central buffer tube 262. An outer jacket 266 surrounds the strength members 264 and the buffer tube 262. The outer jacket 266 includes an outer perimeter having an elongated transverse cross-sectional shape. An additional strength layer 265 (e.g., Kevlar) can be positioned between the buffer tube 262 and the outer jacket 266. As shown at FIG. 3, the transverse cross-sectional shape includes oppositely positioned, generally parallel sides 268 interconnected by rounded ends 270.

Figure 4:
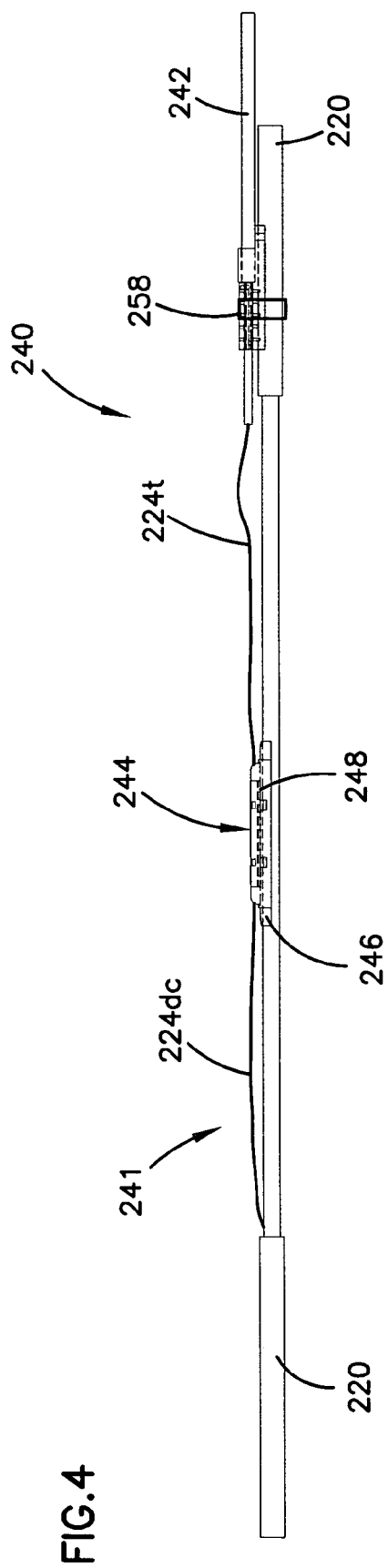
FIG. 4 illustrate a mid-span breakout location on the distribution cable of FIG. 2.

Referring now to FIG. 4, fibers from the tether 242 are connected to fibers from the distribution cable 220 at a mid-span breakout location 241. A breakout assembly 240 is positioned at the mid-span breakout location 241 on the distribution cable 220. A tether 242 branches outwardly from the distribution cable 220 at the mid-span breakout location 241. When the tether 242 is secured to the distribution cable 220, the tether 242 should preferably be able to withstand a pullout force of at least 100 pounds. To meet this pullout force requirement, a retention block 258 is used to strengthen the mechanical interface between the tether 242 and the distribution cable 220.

The breakout location 241 shown in FIG. 4 includes a splice location 244 where selected fibers $224_{dc}$ of the distribution cable 220 (e.g., typically less than twelve fibers) are spliced to corresponding fibers $224_t$ of the tether 242. The breakout assembly 240 includes a splice sleeve 246 positioned over the spliced fibers $224_{dc}$, $224_t$ and a splice holder 248 configured to secure the splice sleeve 246 to the distribution cable 220.

Figure 5:
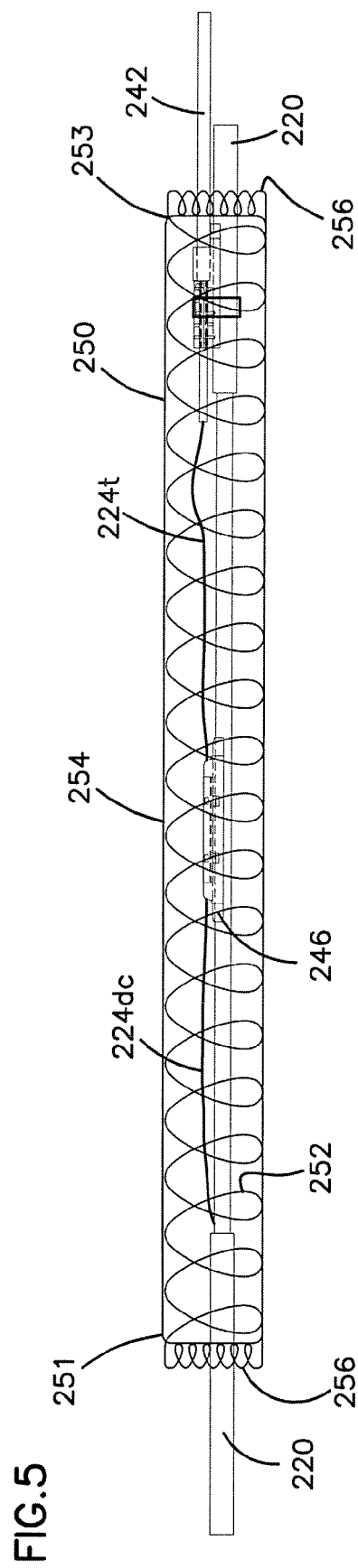
FIG. 5 illustrates a potted closure covering the mid-span breakout location of FIG. 4.

Referring to FIGS. 5-7, the fiber breakout assembly 240 can be sealed and protected from environmental conditions and other contaminants. FIG. 5 illustrates a closure 250 (e.g., a tube) covering the breakout location 241. The spliced fibers $224_{dc}$, $224_t$ are enclosed within the closure 250. The closure 250 can also enclose the retention block 258 through which the fibers $224_t$ of the tether 242 pass when routed to the splice location 244. In some embodiments, one end 251 of the closure 250 overlaps the jacket 230 of the distribution cable 220 on one side of the breakout location and the opposite end 253 of the closure 250 overlaps the jacket 230 of the distribution cable and the outer jacket 266 of the tether cable on the opposite side of the breakout location 241. The closure 250 shown in FIG. 5 is potted on either end 251, 253 with epoxy or other suitable material.

In general, the closure 250 includes an outer body 254 surrounding a reinforcing arrangement 252. The outer body 254 is tube-shaped and the reinforcing arrangement 252 includes one or more ring-shaped members. The outer body 254 is formed of a polymeric material to protect the breakout location 241 from contamination and stress. In one embodiment, the reinforcing arrangement 252 is embedded in the outer body 254. In varying embodiments, the outer body 254 provides protection against or resistance to chemicals, ultraviolet (UV) light, rain, dirt, fungus, and other such contaminants.

Example embodiments of suitable protective closures 250 are shown in FIGS. 6-11. In some embodiments, the reinforcing arrangement 252 of the closure 250 includes a coil spring (see FIGS. 6-8). For example, in one example embodiment, the reinforcing arrangement 252 includes a coiled steel wire. In other embodiments, the reinforcing arrangement 252 includes a plurality of discrete metal rings (see FIGS. 9-11).

In some embodiments, the closure 250 is sufficiently strong and resilient to resist breaking and withstand significant impact and also sufficiently flexible to enable the pre-terminated cable (i.e., the distribution cable 220 with the tethers terminated 242 thereto) to be readily stored on a spool. For example, in one embodiment, the outer body provides 300 lbs. of crush resistance.

Before leaving the factory or manufacturing plant, the breakout location 241 on the distribution cable 220 can be prepared. First two or more ring cuts are provided on the jacket 230 of the distribution cable 220 for facilitating stripping away a portion of the jacket 230. A buffer tube 222 is then selected and two window cuts are made in the selected buffer tube 222. The upstream window location is then used to sever the number of fibers desired to be broken out. The desired number of fibers is then pulled from the buffer tube 222 at the downstream window location 223 (see FIG. 5).

In one embodiment, the fibers extend along the breakout location 241 are provided with at least 2% excess fiber length. In other embodiments, the fibers are provided with at least 3% excess fiber length. In still other embodiments, the fibers are provided with an excess fiber length in the range of 1 to 5% or in the range of 2 to 5% to promote flexibility at the breakout location.

The fibers $224_{dc}$, $224_t$ can be fused using standard fusion splicing techniques. Once the fibers $224_{dc}$, $224_t$ are spliced together, a splice sleeve 246 can be placed over the splice location 241 to protect the splice. After the splice has been completed, the splice can be secured to the distribution cable 220 with a splice holder 248.

Thereafter, the closure 250 is positioned over the breakout location 241. The closure 250 is sized to extend across the entire length of exposed distribution cable 220 where the jacket 230 has been removed. A trailing end of the closure 250 overlaps the retention block 258 and a leading end of the closure 250 overlaps a jacketed portion of the main distribution cable 220. Once the closure 250 has been mounted over the exposed portion of distribution cable 220, potting material 256, such as epoxy, thermoset urethane, room-temperature vulcanizing (RTV) silicone, or other sealant can be added to both ends 251, 253 to form a sealed enclosure around the breakout location 241. In this manner, the closure 250 functions to seal and protect the underlying components of the breakout location 241.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A breakout assembly comprising:
a distribution cable including a breakout location having a length;
a tether cable secured to the distribution cable;
at least one length of optical fiber extending along the length of the breakout location from the distribution cable to the tether cable;
a hollow polymeric tube having an inner diameter and an outer diameter, the polymeric tube including ring-type reinforcements embedded in the polymeric tube between the inner and outer diameters, the polymeric tube extending along the length of the breakout location and enclosing the distribution cable and the length of optical fiber.

2. The breakout assembly of claim 1, wherein one end of the polymeric tube is potted to the distribution cable on one side of the breakout location and an opposite end of the polymeric tube is potted to the tether cable and distribution cable on an opposite side of the breakout location.

3. The breakout assembly of claim 1, wherein the ring-type reinforcements include discrete metal rings.

4. The breakout assembly of claim 1, wherein the ring-type reinforcements include a coil spring.

5. The breakout assembly of claim 1, wherein the polymeric tube includes opposing ends sealed by potting material.

6. The breakout assembly of claim 1, wherein the ring-type reinforcements are embedded in the polymeric tube.

7. The breakout assembly of claim 1, wherein the polymeric tube is sufficiently flexible to enable the distribution cable and the tether cable to be readily stored on a spool.

8. The breakout assembly of claim 1, wherein the at least one length of optical fiber has an excess fiber length range of about 2-5%.

9. A method comprising:
removing an outer jacket from a distribution cable at a breakout location;
accessing an optical fiber from the distribution cable;
fusing the optical fiber from the distribution cable to an optical fiber of a tether cable to form a fused length of optical fiber; and
positioning a hollow polymeric tube having an inner diameter and an outer diameter around the distribution cable and the fused length of optical fiber at the breakout location, the polymeric tube including ring-type reinforcements embedded between the inner diameter and the outer diameter of the polymeric tubes.

10. The method of claim 9, further comprising:
potting opposing ends of the polymeric tube to seal the fused length of optical fiber within the polymeric tube.

11. The method of claim 9, further comprising:
winding the distribution cable on a spool, wherein the tether cable and the polymeric tube are secured to the distribution cable.

* * * * *